United States Patent [19]

Quesada

[11] Patent Number: 4,951,913
[45] Date of Patent: Aug. 28, 1990

[54] HITCH-VIEWING MIRROR ASSEMBLY EMPLOYING THREE CLAMPING ARMS FOR GRASPING PICKUP TRUCK'S TAILGATE PANEL

[76] Inventor: David M. Quesada, 330 Ormonde Rd., Arroyo Grande, Calif. 93420

[21] Appl. No.: 299,079

[22] Filed: Jan. 23, 1989

Related U.S. Application Data

[63] Continuation-in-part of Ser. No. 57,811, May 21, 1987, abandoned.

[51] Int. Cl.$^5$ .............................................. B60K 1/06
[52] U.S. Cl. .................................. 248/485; 248/278; 350/632
[58] Field of Search ...................... 248/479, 231.4, 485, 248/542, 543, 476, 484, 278; 350/604, 632

[56] References Cited

U.S. PATENT DOCUMENTS

| | | | |
|---|---|---|---|
| 1,918,802 | 7/1933 | Fleischer | 248/485 X |
| 3,332,731 | 7/1967 | Penk | 350/632 |
| 3,482,811 | 12/1969 | Zent | 248/485 X |
| 3,488,026 | 1/1970 | Wallace et al. | 248/231.4 |
| 4,158,451 | 6/1979 | Lukey | 248/479 |
| 4,368,868 | 1/1983 | Urban | 248/479 |
| 4,477,149 | 10/1984 | Crespy | 248/542 |

FOREIGN PATENT DOCUMENTS

| | | | |
|---|---|---|---|
| 2543083 | 9/1984 | France | 350/604 |
| 39845 | 3/1980 | Japan | 350/604 |
| 223044 | 10/1924 | United Kingdom | 350/632 |

*Primary Examiner*—Alvin C. Chin-Shue
*Attorney, Agent, or Firm*—David Pressman

[57] ABSTRACT

A trailer-hitch-viewing mirror tool that can be temporarily mounted on the tailgate of a pickup truck or the rear window of a station wagon, camper, or other towing vehicle. It easily adjusts to pickup truck's tailgate or other towing vehicle's rear window and can be utilized by anyone without special skills or instruction. It conveniently allows the driver of the towing vehicle to align its hitch ball to the mating trailer hitch socket by affording the driver a clear view of the hitch parts from the driver's seat. The driver slowly backs up while viewing the mating hitch parts through the tailgate or rear-window-mounted mirror, whereby he or she can align the hitch ball to the mating trailer hitch, completing the task quickly, comfortably, and without assistance.

14 Claims, 5 Drawing Sheets

HITCH-VIEWING MIRROR ASSEMBLY EMPLOYING THREE CLAMPING ARMS FOR GRASPING PICKUP TRUCK'S TAILGATE PANEL

CROSS-REFERENCE TO RELATED APPLICATION

This application is a continuation-in-part of application Ser. No. 07/057,811, filed 1987-5-21, now abandoned. This CIP application added the embodiment of FIGS. 5 to 7.

FIELD OF INVENTION

This invention relates to vehicles, particularly to a mirror assembly for a towing vehicle, such as a pickup truck, station wagon, or the like.

DESCRIPTION OF PRIOR ART

It is generally well known that attaching a male hitch ball of a towing vehicle, such as a pickup truck, to a mating female hitch socket of a towed vehicle, such as a trailer, can be very time consuming. If the driver of the towing vehicle looks through its rear-view mirror, he or she cannot see the proposed attachment since the matable parts are well below eye level. Generally it is impossible for the driver to see the parts at all. Thus it is usually necessary for the driver to get out of the towing vehicle two, three, or four times, walking back to the attachment point to see if the matable parts are sufficiently aligned so that they can be joined, which is usualy done by cranking or jacking down the female socket to mate with the hitch ball.

This problem is especially troublesome with a pickup truck since its tailgate, whether vertical or horizontal, is like a wall which interferes with the view the driver needs to effect a connection. Often a second person is needed to give directions to the driver of the pickup truck. These directions include controlling the distance from the pickup truck's hitch ball to the trailer's socket, as well as the lateral alignment of the mating hitches. However such verbal directions are a poor form of communication: it often takes many tries to effect alignment and in some cases, the driver may damaged the towing vehicle and/or trailer. Hand signals have also been used, especially by construction workers, who operate equipment frequently and thus are familiar with hand signals. However the use of hand signals also requires two people and a prearranged set of signals, yet is less communicative than verbal directions.

The problem also occurs when the towing vehicle is a station wagon or camping vehicle, such as a dedicated camper or a camper body which is mounted in a pickup truck. The rear panel of these vehicles also obstructs the driver's view of the hitch ball and mating trailer socket.

Thus connecting a male hitch ball to a trailer socket proved to be inconvenient, time consuming, and sometimes frustrating.

OBJECTS AND ADVANTAGES

According, I claim the following as one object and advantage of my invention: to provide way in which a driver can easily and rapidly connect a towing vehicle's male hitch ball to trailer socket. Other objects and advantages are to provide an alignment apparatus where the driver does not have to get out several times to observe alignment, where damage to the towing and towed vehicles is avoided, and where two persons are not needed, where verbal communication and hand signal communication is avoided, and where pickup trucks, station wagons, campers, and the like can be all aligned easily and rapidly. Readers will find further objects and advantages of the invention from a consideration of the description and the accompanying drawings.

SUMMARY

A mirror assembly is arranged so that it can be temporarily mounted on the rear and behind of a towing vehicle in a position which enables the driver to see the alignment of the ball hitch and the trailer's mating socket. On a pickup truck, a mirror bracket is mounted on the tailgate of the truck, enabling the driver to view the mating parts easily. The tailgate mirror bracket is placed to one side of center with the mirror over the hitch ball. The mirror holder contains a bubble level, similar to a carpenter's level, so that it can be adjusted to a predetermined angle with the horizontal, generally 45°. This method is convenient to the driver and enables a fast, easy, comfortable, unassisted attachment of the pickup truck hitch ball to the trailer hitch.

If a trailer is to be attached to a station wagon or camper, the mirror assembly with a hitch-viewing mirror according to the invention is mounted temporarily be means of suction cups on the rear window of the towing vehicle by a pair of bracket arms which position the mirror behind the vehicle. This enables the driver to look backward, into the regular rear-view mirror, through the rear window, into the hitch-viewing mirror so as to see the matable hitch parts and thereby be able to manuver the towing vehicle until the parts are properly oriented for mating.

DRAWINGS

FIG. 1 is an exploded view of a mirror assembly for use on the tailgate of a pickup truck.

FIGS. 2, 3, and 4 are front-perspective, side, and rear views, respectively, of the mirror assembly of FIG. 1 installed on a such tailgate.

FIGS. 1-4—MIRROR ASSEMBLY FOR USE ON PICKUP TRUCK

FIGS. 1 to 4 show a version of a mirror assembly according to the invention for use on the rear tailgate of a pickup truck. The mirror assembly is designed to be temporarily mounted on the tailgate for enabling the driver to see the pickup truck's hitch ball and the trailer's mating socket. Thereby the driver can manuver the truck until the hitch parts are sufficiently aligned to be mated by lowering the trailer socket in a vertical direction.

Figure 3:
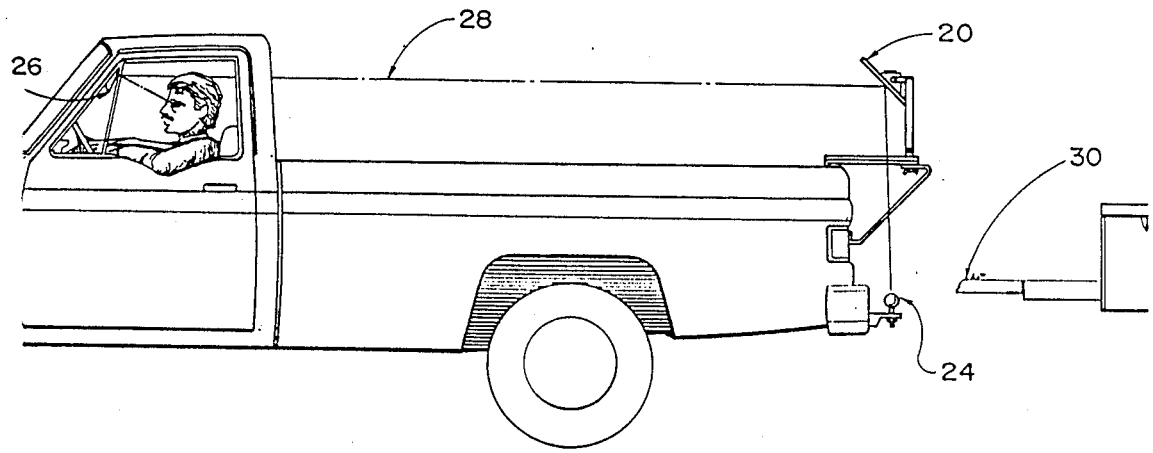
Figure 4:
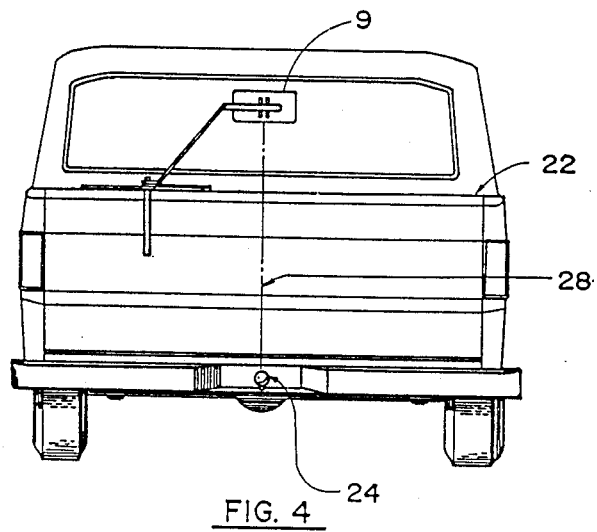

FIGS. 3 And 4: FIGS. 3 and 4 shows a tailgate mirror assembly 20 mounted on tailgate 22 of a pickup truck. Assembly 20 includes a bracket for holding a mirror 9 so that its reflecting surface faces forward and down at an approximately 45° angle from the horizontal. Thus the driver of the pickup truck, who is in the front seat, has a clear line of sight 28 from his eyes forward to his rear-view mirror 26, then back to mirror 9 of assembly 20, and then down so that he can see hitch ball 24 of his truck and mating trailer hitch socket 30, assuming that trailer hitch 30 is sufficiently close to ball 24.

In this manner, the driver can maneuver his truck until its hitch ball 24 is directly under the socket of trailer hitch 30. Then the driver will get out of his truck, walk back to the trailer, and lower its using its conventional jacking mechanism until its hitch 30 mates with hitch ball 24 in conventional fashion.

Figure 1:
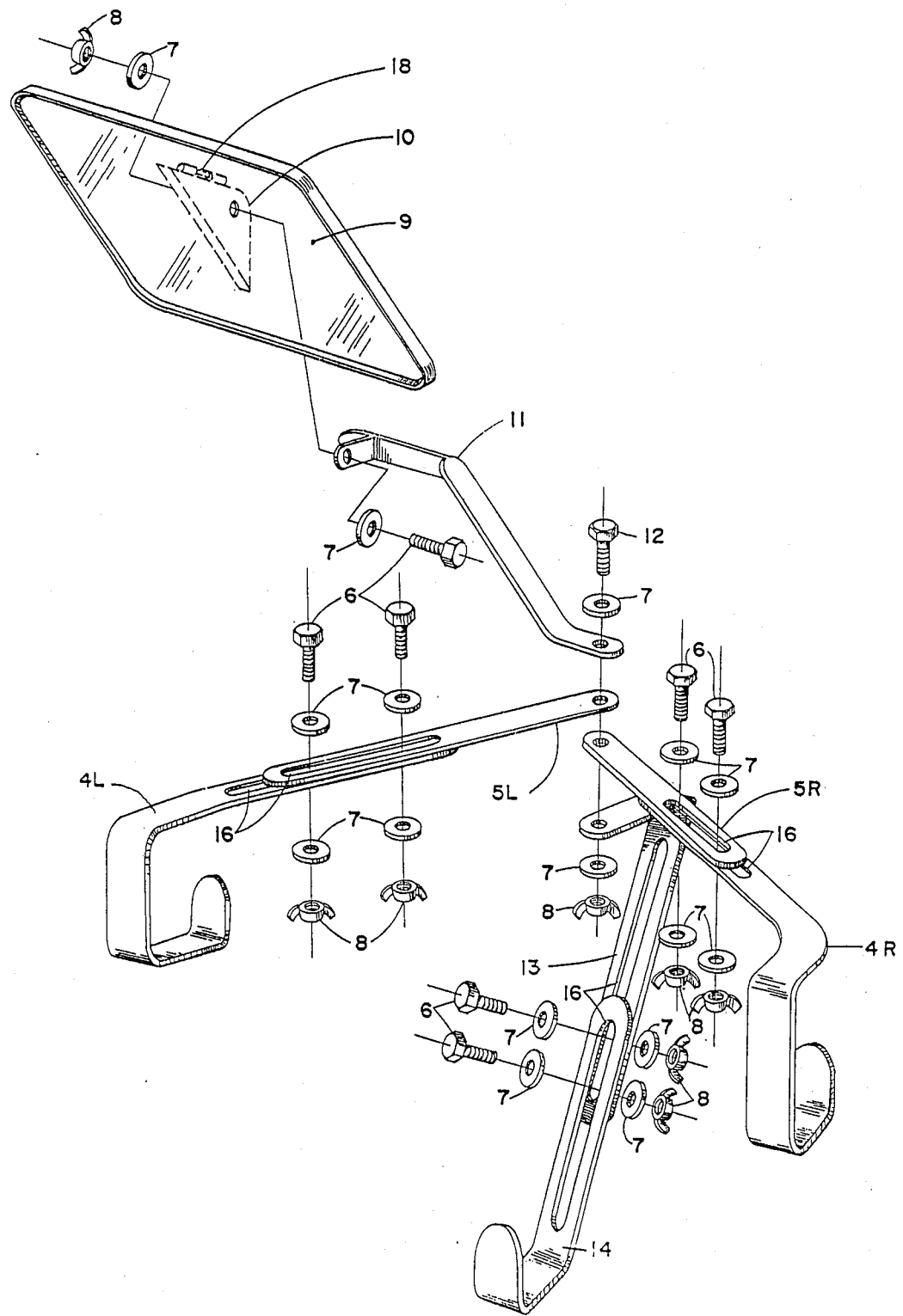
Figure 2:
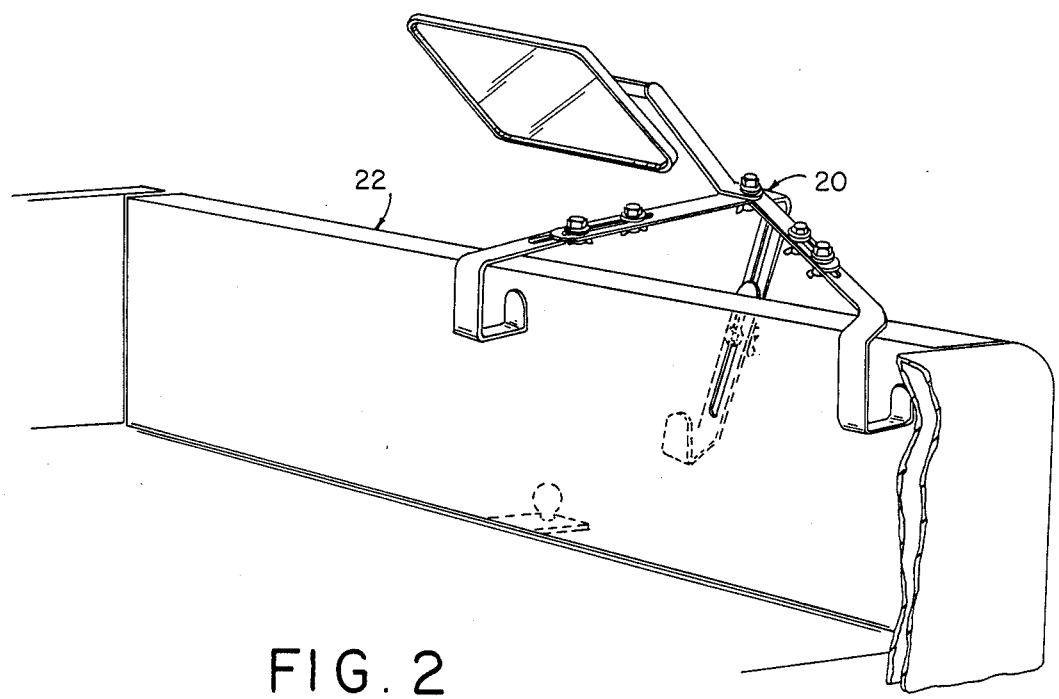

FIGS. 2 And 4: As shown in FIGS. 2 and 4, bracket 20 is mounted to tailgate 22 at a position offset from center so that line of sight 28 will be unobstructed. Mirror 9 is centered over hitch ball 24 (FIG. 4) so that line of sight 28 will be directed to the hitch ball 24. In this manner the driver can manuver the truck so that its hitch ball will be under the trailer's hitch socket 30. This operation can be completed easily in a minimum of time without any special skills or instructions, and in an unassisted manner.

FIG. 2: The mirror is mounted on the tailgate in a temporary manner by bracket 20 which includes an upper bracket portion 11 (FIG. 1) which extends substantially horizontally to one side and upward. A short portion of of the highest point of upper bracket 11 extends laterally and has a hole for attachment to a triangular extension on the back of a mirror holder 10. Holder 10 comprises a fitted one-piece frame which extends around mirror 9. Holder 10 functions to tilt mirror 9 vertically.

A bubble level 18, similar to a carpenter's level, is mounted on holder 10 at aproximately a 45° angle to the reflecting surface of mirror 9. Level 18 indicates a level condition when the reflecting surface of mirror 9 is at an angle of 45° to the horizontal. A bolt 6 and a wing nut 8 with washers 7 are used to attach mirror holder 10 to a lateral hole in the upper horizontal arm of upper bracket 11.

The lower end of bracket 11 has a hole for a center bolt 12 which mates with a wing nut 8 and washers 7. These attach bracket 11 to a left extension bracket 5L and a right extension bracket 5R, as well as an upper center bracket 13 as shown. Left extension bracket 5L and right extension bracket 5R extend horizontally and forward, as indicated.

Left extension bracket 5L and right extension bracket 5R are each attached by respective left and right support brackets 4L and 4R.

Left support bracket 4L and right support bracket 4R can be individually adjusted horizontally by loosening two wing nuts 8 at their respective slots 16, located as shown.

Left support bracket 4L and right support bracket 4R are both U shaped at their forward ends for mounting over the top inside edge of tailgate 22, as shown in FIG. 2.

Upper center bracket 13 is shaped for attachment by center bolt 12 to provide vertical support. Upper center bracket 13 also has a slot 16 which is matable with similar slots 16 on left extension bracket 5L and right extension bracket 5R.

Bottom center bracket 14 is attached to upper center bracket 13 along their slots 16 so that vertical adjustment can be effected by loosening wing nuts 8 which mate with bolts 6. Washers 7 are placed on bolts 6 as shown.

Bottom center bracket 14 has a U shaped configuration at its lower end mounting over the outside of tailgate 22, as indicated in FIGS. 2 to 4.

FIG. 2: FIG. 2 clearly indicates how the tailgate mirror bracket is mounted.

As shown, left support bracket 4L and right support bracket 4R are mounted over the inside of tailgate 22. The U shape of these brackets makes a secure attachment on the inside of the tailgate.

The U-shaped bottom of bracket 14 mounts on the outside of outside of tailgate 22 to provide vertical stability.

Upper bracket 11, extends substantially horizontally to one side, upward, and parallel to tailgate 22. The primary object of this off-center support is to enable mirror 9 to provide a clear, unobstructed line of sight 28 (FIGS. 3 and 4) of hitch ball 24 by the driver of the pickup truck. Mirror holder 10, supported at the upper end of the upper bracket 11, provides vertical adjustment. Bubble level 18 enables the driver to properly adjust mirror 9 to a 45° angle with the horizontal, as mentioned supra. After adjustment so that the bubble in level 18 is situated between the usual two lines on the level, similar to a carpenter's level, proper adjustment will be obtained so that the driver can tighten wing nuts 8.

When the driver desires to hitch the pickup truck to a trailer, he will mount the mirror assembly on the tailgate of the pickup truck as shown, back up the truck to that the parts are in alignment, attach the ball hitch to the trailer's socket in the usual fashion, and then remove the assembly.

FIGS. 5-7--MIRROR ASSEMBLY FOR USE ON STATION WAGON AND CAMPER

In an alternative embodiment of the invention, added by this CIP application, the hitch-viewing mirror assembly can also be used on towing vehicles which have no tailgate with a free top edge, specifically on station wagons and campers. In these vehicles, the mirror assembly is mounted by suction cups on the rear window of the townig vehicle.

Figure 6:
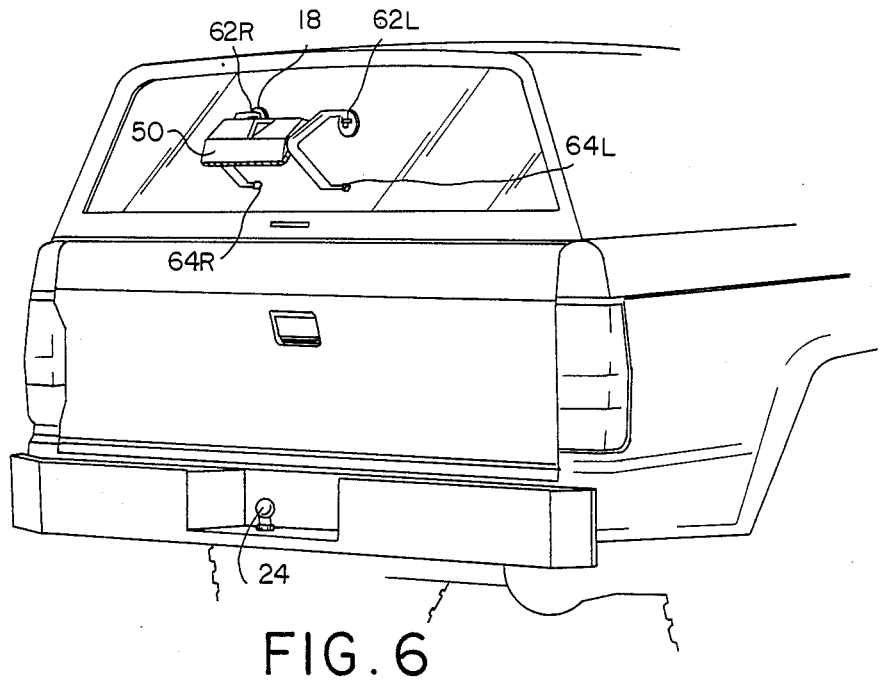
FIGS. 6 and 7 are rear-perspective views of the mirror assembly of FIG. 5 installed on a station wagon and a camper, respectively.

FIG. 6: As shown in FIG. 6, a mirror assembly 50 is temporarily mounted by means of suction cups 62L and 62R and feet 64L and 64R on the rear window of a station wagon. The mirror is similar to that of FIG. 1, but is pivoted at its sides, rather than on its back. Through the use of a level 18 similar to that of FIG. 1, it is also adjusted to a 45° angle so that a driver loking back, as in FIG. 3, can see this mirror via a horizontal path. Since the brackets are on either side of the mirror, it will provide the driver with a clear view of hitch ball 24 on the rear of the wagon and the adjacent area. Thus, as in the embodiment of FIGS. 1 to 4, the driver will be able easily and accurately to manuver the wagon so that hitch ball 24 is under the mating trailer's hitch socket.

In operation, the mirror assembly is installed on the rear window by first wetting suction cups 62, positioning the mirror at approximately the center of the rear window or at the level of the driver's rearview mirror (similar to mirror 26 of FIG. 3), pushing suction cups 62 against the rear window to affix them while allowing feet 64 to rest against lower portions of the rear window. Then the wagon is manuvered into position and the hitch is mated. Thereafter the mirror assembly is removed by inserting the tip of a blade, a plastic card, or the like under the edges of the suction cups to break their seals, and then removing and storing the mirror assembly until it is needed again. (The mirror assembly should not be left in position while driving since it blocks a significant portion of the view through the rear window.)

Figure 5:
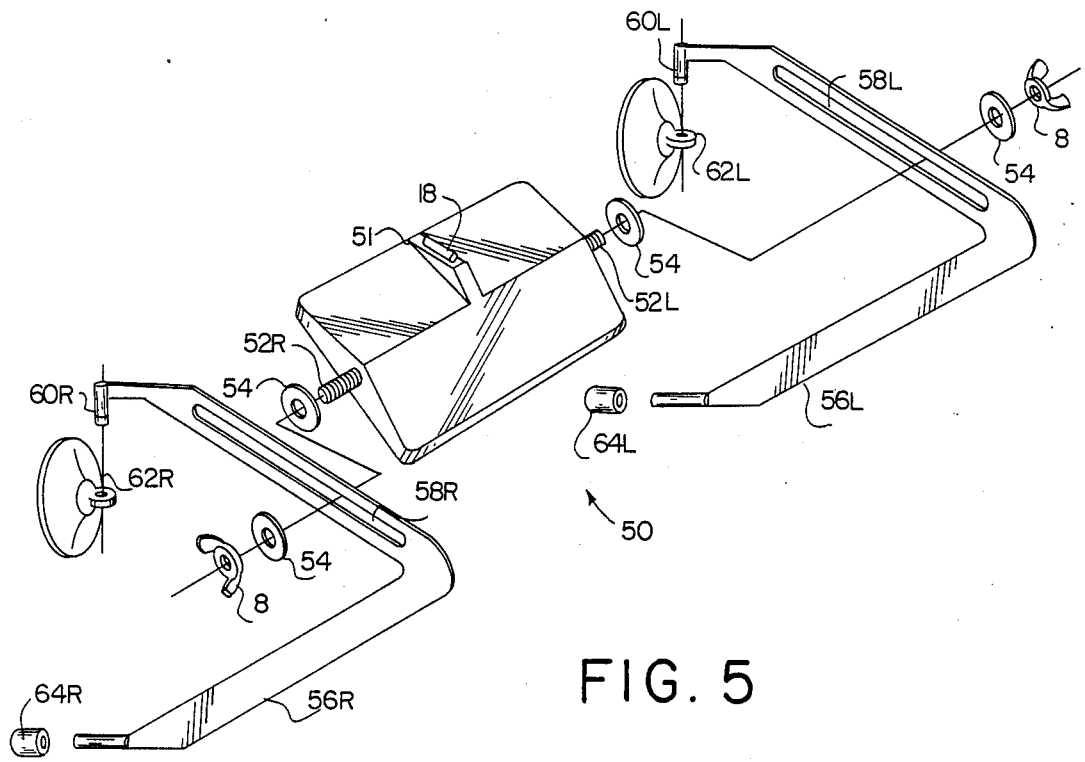
FIG. 5 is a perspective view of a mirror assembly according to an alternative embodiment for use on the rear window of a camper or station wagon.

FIG. 5: As shown in FIG. 5, the mirror assembly for use on a rear window comprises mirror 51 with its level 18, but with side bolts or threaded studs 52L and 52R. These side bolts are attached, by means of washers 54 and thumbscrews 8, to respective brackets 56L and 56R. This permits the mirror to be pivoted about the axis of bolts 52 so that it can be adjusted until the bubble in its level 18 is centered, whereupon the level will be at the desired 45° angle.

Each bracket is an elongated flat member which has two major straight sections which are connected by a slightly acute bend, as shown. The upper section has an elongated slot 58 (R &L) through which bolt 52 extends. The mirror is affixed at a position in these slots so that it will be mounted sufficiently far behind the rear window of the towing vehicle that the driver can have an unobstructed view of hitch 24. The end of the upper section has a downwardly extending portion 60 (R & L) which is attached to the rear of a suction cup 62 (R & L). The bottom section has an end which forms a foot 64 (R & L) which has a rubber tip to prevent breakage or scratching of the glass of the rear window.

Figure 7:
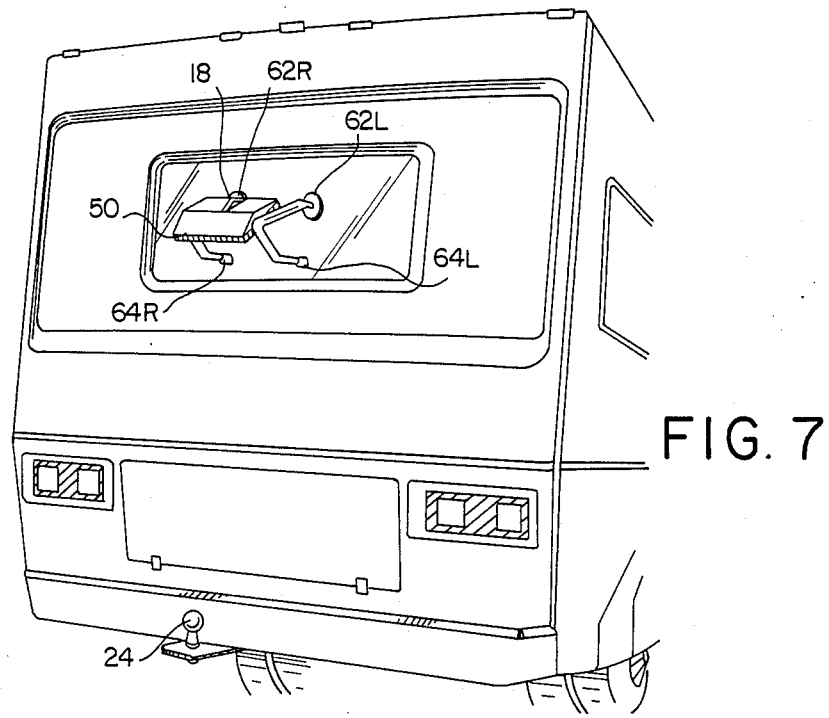

FIG. 7: The mirror assembly of FIG. 5 can also be used on the rear window of a camper, as shown in FIG. 7, or on any other towing vehicle with a rear window, such as a panel truck.

CONCLUSION, RAMIFICATIONS, SCOPE

The reader will thus see that I have provided a hitch viewing mirror assembly which is economical in construction, easy to install and remove, and which enables the hitch of a towing vehicle to be easily, accurately, and rapidly mated with the socket of a towed vehicle without requiring the driver to get out of the towing vehicle and which eliminates trial-and-error procedures, equipment damage, and the need for assistance.

While the above figures and descriptions contain many specificities, the reader should not construe these limitations on the scope of the invention, but merely as exemplifications of several preferred embodiments thereof. Various other embodiments are possible. E.g., the hitch can be of other types than the ball-and-socket type, the hitch can be mounted higher on the towing vehicle than as shown, the mirror can be mounted by temporary holding brackets having other shapes, e.g., the mirror assembly can be hung from the roof of the camper or wagon, it can utilize clamps or the like, the mirror can be a frameless metal or acrylic mirror, it can be concave or convex, the mirror assembly can be mounted at front-and-downward-facing angles of ther than 45°, etc.

Therefore the full scope of the invention should be determined by the appended claims and their legal equivalents, and not by the examples given.

I claim:

1. A trailer-hitch-viewing mirror assembly for use on a towing vehicle having a trailer hitch at its rear and for enabling a driver of said vehicle to view said hitch so as to be able to maneuver said vehicle into a position where said hitch is aligned with the mating hitch of a vehicle to be towed, comprising, in combination;
   (a) a mirror,
   (b) means for mounting said mirror on the rear of said towing vehicle, said means arranged to mount said mirror in a position spaced behind said vehicle and in a position facing forward and downward, such that said driver of said towing vehicle, while seated in a driver's seat in the front of said vehicle, can see said hitch in said mirror, so that said driver can accurately maneuver said towing vehicle while viewing said hitch in said mirror, and without assistance from another person, until said hitch is aligned for connection with the mating hitch of a vehicle to be towed, said means for mounting said mirror comprising:
   (1) a bracket assembly for attaching said mirror to a vertically oriented tailgate panel of a pickup truck, said bracket assembly comprising three elongated tailgate panel-grasping arms which can be removably positioned on both sides of said tailgate panel to hold said mirror in a fixed position spaced behind said tailgate panel,
   (2) each of said tailgate panel-grasping arms having a proximal end and an opposite distal end, the proximal ends of all three arms having apertures therein, said apertures being aligned and connected together at a common junction for pivoting said grasping arms about a vertical axis,
   (3) said tailgate panel-grasping arms being bent and shaped so that when said common junction is positioned above said tailgate panel at a predetermined location, the distal ends of two of said said arms will contact and rest against one side of said tailgate panel and a portion of each of said two arms arm spaced in from said distal end thereof will contact and rest against the top of said tailgate panel, and the third of said arms will contact and rest against the other side of said tailgate panel, such that said three arms will mount said assembly in a stable position around said tailgate panel without drilling any hole in or affixing adhesives to said tailgate panel, and
   (4) a mirror support arm comprising an elongated member having proximal and distal ends, said distal end having a first aperture therein, said first aperture being aligned with and being connected to said common junction for pivotally connecting said support arm about said axis, said proximal end having a second aperture orthogonal to said first aperture and pivotally connecting said mirror so as to support said mirror in a position behind and above said tailgate panel where said driver, when driving said vehicle, can look rearwardly into said mirror and be able to see said hitch therein.

2. The assembly of claim 1 wherein each of said tailgate panel-grasping arms has a portion, adjacent said proximal end thereof, which extends generally away from said common junction, and a portion, adjacent said distal end thereof, which is bent so that said distal end thereof extends to said tailgate panel in a direction generally toward said common junction.

3. The assembly of claim 1, further including means for enabling said tailgate panel-grasping arms to be adjusted in length.

4. The assembly of claim 3 wherein said tailgate panel-grasping arms each having a U-shaped portion at an end thereof, said arms being shaped such that each of said U-shaped ends contacts said tailgate panel.

5. The assembly of claim 1 wherein said mirror is planar and said proximal end of said mirror support arm has mounting means attached thereto for enabling the angle of said mirror to be adjusted.

6. The assembly of claim 5, further including leveling means mounted on said mirror for enabling the angle of said mirror to be precisely adjusted to a predetermined angle.

7. The assembly of claim 6 wherein said mirror is mounted in a frame and said leveling means comprises a level mounted on the rear of said mirror at an angle of about 45° to the reflecting surface of said mirror.

8. The assembly of claim 1 wherein said tailgate panel-grasping arms and said mirror support arm are shaped to grasp a portion of said tailgate panel offset from the center thereof and to position said mirror behind the center of said tailgate panel.

9. The assembly of claim 1, further including means for enabling the angles of said tailgate panel-grasping arms and said mirror suport arm to be adjusted with respect to each other.

10. The assembly of claim 9 wherein said tailgate panel-grasping arms are adjustable in length.

11. The assembly of claim 10 wherein said tailgate panel-grasping arms each have a U-shaped portion at an end thereof.

12. The assembly of claim 11 wherein said mirror is planar and said proximal end of said mirror support arm has mounting means attached thereto for enabling the angle of said mirror to be adjusted.

13. The assembly of claim 12, further including leveling means mounted on said mirror for enabling the angle of said mirror to be precisely adjusted to a predetermined angle.

14. The assembly of claim 13 wherein mirror is mounted in a frame and said leveling means comprises a level which is mounted on the rear of said mirror at an angle of about 45° to the reflecting surface of said mirror.

* * * * *